(No Model.)
O. C. MEHURIN.
VEHICLE AXLE.
No. 267,559.                     Patented Nov. 14, 1882.
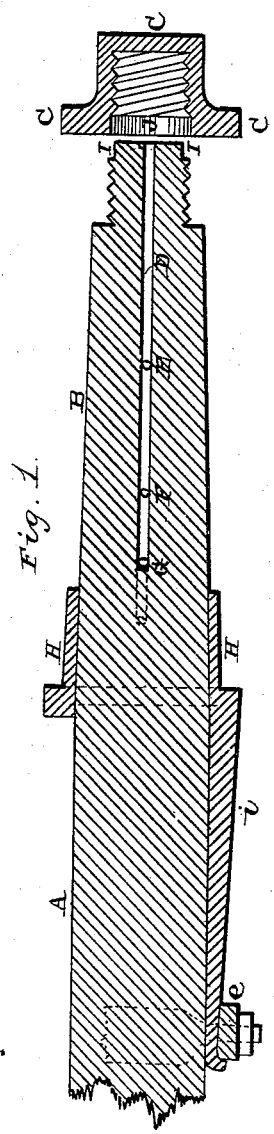
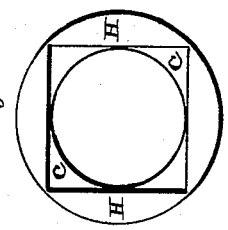
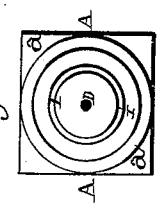
Witnesses.
W. W. Mortimer
W. H. Kern
Inventor.
O. C. Mehurin,
per
F. A. Lehmann,
Atty.

UNITED STATES PATENT OFFICE.

OSCAR C. MEHURIN, OF NEWARK, OHIO.

VEHICLE-AXLE.

SPECIFICATION forming part of Letters Patent No. 267,559, dated November 14, 1882.

Application filed March 17, 1882. (No model.)

*To all whom it may concern:*

Be it known that I, OSCAR C. MEHURIN, of Newark, in the county of Licking and State of Ohio, have invented certain new and useful Improvements in Axles and the Lubrication of Spindles; and I do hereby declare the following to be a full, clear, and exact description of the invention, such as will enable others skilled in the art to which it pertains to make and use it, reference being had to the accompanying drawings, which form part of this specification.

My invention relates to an improvement in axles and the lubrication of spindles; and it consists in a spindle which is made hollow and has suitable openings extending outward at an angle to the central opening, and which central opening in the spindle is to be filled with oil which is poured into the nut, so that in applying the nut the spindle is lubricated.

The object of my invention is to provide a suitable means of centering the nut upon the end of the spindle before beginning to screw it into place, and to provide an easy means of lubricating the spindle.

In the accompanying drawings, Figure 1 is a longitudinal vertical section of my invention. Fig. 2 is an end view of axle. Fig. 3 is an end view of the collar.

A represents the axle; B, the spindle, and C the nut, which is applied to the outer end of the spindle for the purpose of holding the wheel in place. This spindle is made hollow, as shown, so as to receive the lubricating-fluid, and from this central opening, D, extends the openings E F, at any suitable angle toward the rear side of the spindle, for the purpose of carrying the lubricating-fluid directly into the box. From the inner end of the opening D extends the third opening, G, which runs backward at any desired angle, and passes through the sleeve H, which is applied to the inner end of the spindle. The axle has a square shoulder, *a*, formed on it, and the collar has a corresponding socket, *c*, formed in its inner side to catch over this shoulder. This socket, together with the arm *i*, which extends back to the clip *e*, prevents the sleeve from becoming displaced or turning around upon the axle. This construction effects an immense saving in forging the usual collars upon the axles, which work requires not only skilled labor but special machinery for this purpose. The axle has only to have the spindle turned off, leaving the shoulder, and then the collar is slipped into place and secured.

Heretofore there has always been a great trouble experienced in starting nuts upon a threaded bolt, screw, or any other threaded object; but more especially is this true in starting nuts upon the ends of spindles. In order to form a safe and sure guide for centering the nut upon the end of the spindle before beginning to screw the nut into place, the outer end of the spindle is made perfectly plain, as shown at I, so as to form a tenon which will enter the inner end of the nut C, which is also made plain and smooth, as shown at J. This tenon I will enter the socket J until the screw-thread which is formed in the nut encounters the thread which is formed upon the outer end of the spindle, and these parts form a sure and reliable guide by means of which the nut can always be centered, so that it can be easily and surely screwed into position without the slightest trouble. Before this nut is to be applied to the end of the spindle it is to be filled with oil or any suitable lubricant, and then when the nut is applied to the spindle the oil is forced into the central opening, D, in the spindle, and from this opening it is fed into the box of the wheel. The smooth parts I J enable the end of the spindle to be slipped into the nut sufficiently far to prevent any leakage of the oil, whereas if the two parts were threaded out to their outer ends in the usual manner a large proportion of the oil would nearly always be lost while centering the nut so that it could be screwed into place.

Having thus described my invention, I claim—

1. An axle having a smooth tenon, I, formed on the end of its spindle, in combination with a nut that is closed at its outer end and provided with an internal screw-thread to fit upon the outer end of the spindle, substantially as shown.

2. The combination of an axle having the shoulder *a* with a recessed collar to fit over the shoulder and a means for holding the collar in position, substantially as set forth.

In testimony whereof I affix my signature in presence of two witnesses.

OSCAR C. MEHURIN.

Witnesses:
I. L. TAYLOR,
H. J. RICKENBAUGH.